Figure 1:
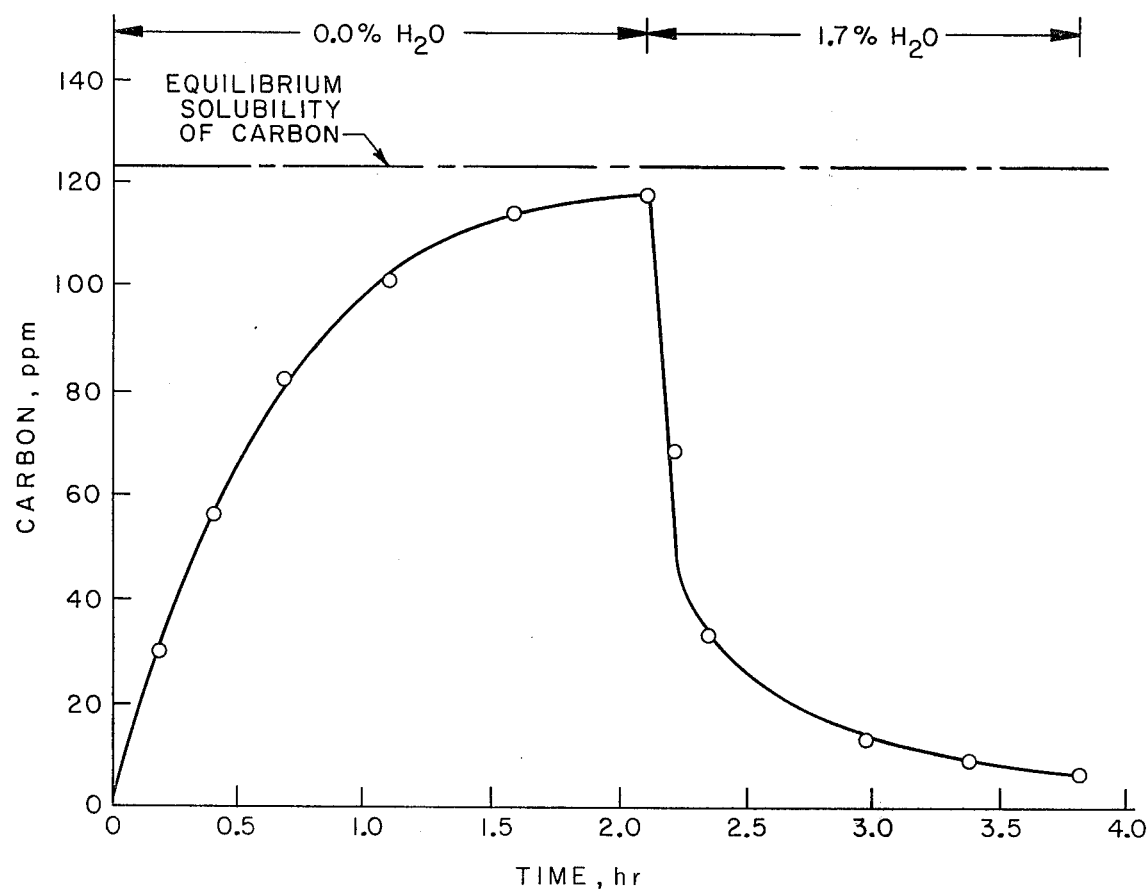

United States Patent [19]

Davis et al.

[11] 4,414,043

[45] Nov. 8, 1983

[54] CONTINUOUS DECARBURIZATION ANNEALING WITH RECYCLE TO CONVERT CARBON MONOXIDE

[75] Inventors: Frank N. Davis; Harry H. Podgurski, both of Greensburg, Pa.

[73] Assignee: United States Steel Corporation, Pittsburgh, Pa.

[21] Appl. No.: 341,737

[22] Filed: Jan. 22, 1982

[51] Int. Cl.$^3$ .............................................. C21D 1/48
[52] U.S. Cl. ......................................... 148/16; 148/14
[58] Field of Search ..................... 148/13, 16.5, 16, 14

[56] References Cited

U.S. PATENT DOCUMENTS

| | | | |
|---|---|---|---|
| 2,435,946 | 2/1948 | Robiette et al. | 148/16.5 |
| 3,925,109 | 12/1975 | Nilsen | 148/16.5 |
| 4,049,472 | 9/1977 | Arndt | 148/16.5 |
| 4,201,600 | 5/1980 | Luiten et al. | 148/16.5 |
| 4,207,120 | 6/1980 | Armstrong et al. | 148/16.5 |

*Primary Examiner*—John P. Sheehan
*Attorney, Agent, or Firm*—Arthur J. Greif

[57] ABSTRACT

In the decarburization annealing of steel strip, wherein the annealing atmosphere flows counter to the strip motion in the furnace, there is an undesirable buildup of carbon monoxide in the zone where the strip enters the furnace. Carbon monoxide is undesirable because it slows the decarburization of the strip by a back reaction. The carbon monoxide is removed from the buildup zone and catalytically converted to methane and water by a known reaction with hydrogen, and the water and methane are in-turn recycled near the buildup zone of the furnace. It was found that the presence of water at temperatures up to 1600° F. prevents methane from acting as a carburizing agent.

7 Claims, 2 Drawing Figures

CONTINUOUS DECARBURIZATION ANNEALING WITH RECYCLE TO CONVERT CARBON MONOXIDE

When steel is decarburized in an atmosphere containing hydrogen and water vapor, the resultant reaction produces CO which is considered undesirable because it slows down the decarburization rate by a back reaction. To remove the CO or to reduce it to a level consistent with effective decarburization, the art has resorted to such techniques as (i) purging the annealing atmosphere with pure nitrogen, pure hydrogen, or various combinations thereof, thus significantly increasing the amount of nitrogen and hydrogen required—concomitantly increasing the cost of the process; or (ii) removing the CO and oxidizing it either with oxygen or water vapor to produce $CO_2$, thus necessitating the use of a scrubber to subsequently remove the $CO_2$. The instant invention takes advantage of the countercurrent flow of the annealing atmosphere to that of the strip, so that it is only necessary to recycle that part of the annealing atmosphere in which the buildup of CO is critical. A portion of the contaminated atmosphere containing CO is removed, cooled, and the CO content thereof is converted to $CH_4$ at a low temperature over a catalyst. The resultant $CH_4$-rich atmosphere is thereafter returned to the furnace at a zone thereof where water vapor is present in the annealing atmosphere. It has been found that $CH_4$, although normally considered to be a contaminant due to its ability to recarburize the steel will, in fact, act as an ineffective carburizing agent in the presence of water vapor and need not be removed from the recycle atmosphere—avoiding the cost of further conversion and/or scrubbing.

Figure 2:
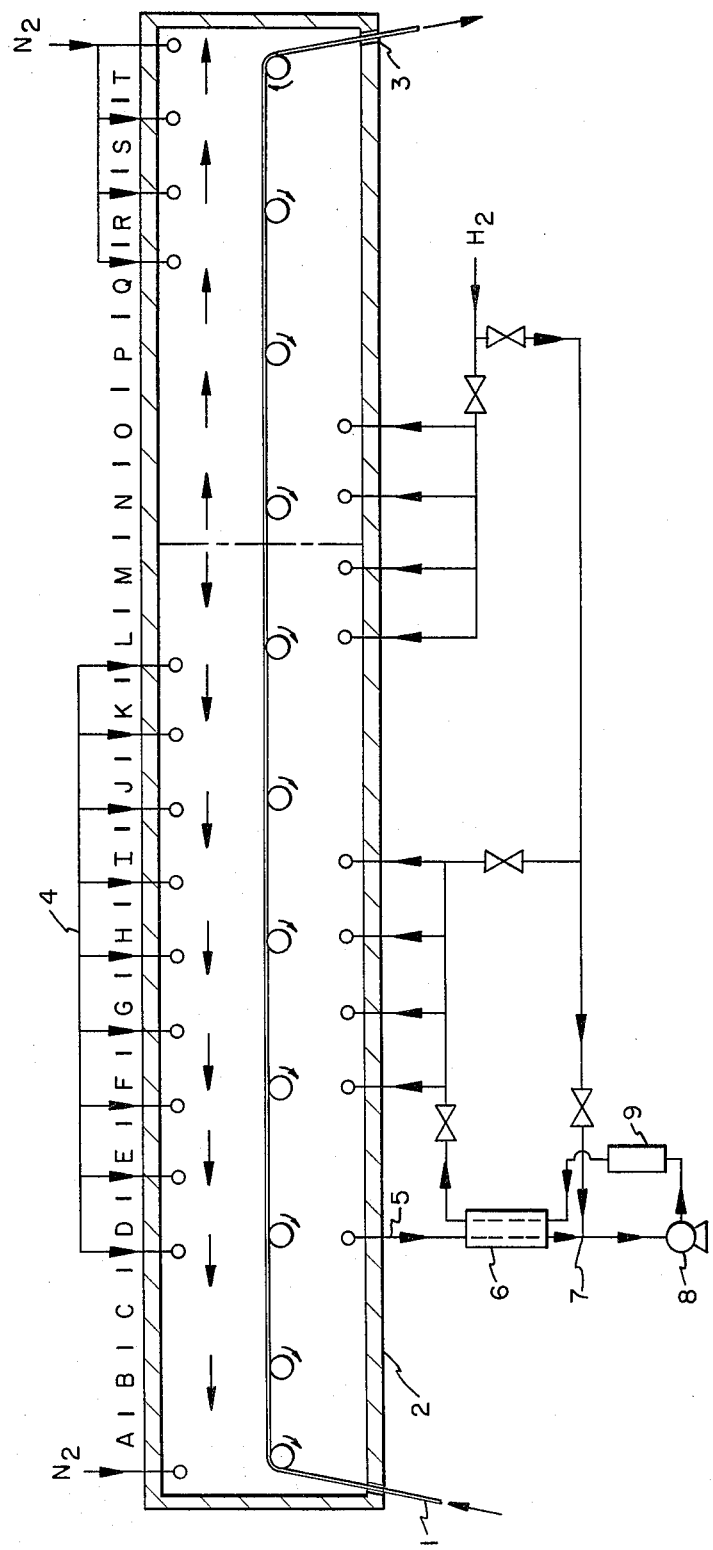

The advantages of this invention will become more apparent from a reading of the following description when read in conjunction with appended claims and the figures, in which:

FIG. 1 is a graphical representation of results from laboratory experiments illustrating the effect of water vapor on the carburizing power of $CH_4$—$H_2$ mixtures, and FIG. 2 is a preferred embodiment, illustrating the various flow paths desirably employed in the subject recycle system.

Studies were conducted to determine which of several chemical reactions controlled the rate of carbon transfer between the annealing atmosphere and a steel sheet. In non-equilibrated gas mixtures of $CH_4$, $H_2$, CO, $CO_2$, $H_2O$ and $N_2$, any one or a combination of the following three reversible reactions could fix the effective activity of carbon:

  (I)

  (II)

  (III)

The rate determining reaction was identified by comparing observed steady-state carbon weight gain (or loss) in iron sheet specimens with a calculated value for carbon activities in non-equilibrated gas mixtures. The sheet steel specimens were suspended from a highly sensitive balance and various controlled mixtures of the gases in question were flowed past the specimen at high space velocities. Carbon pickup or loss was thereby monitored gravimetrically as a function of time and FIG. 1 shows one series of such measurements in both dry and wet $H_2$—$CH_4$ gas mixtures in which the gases indicated were flowed at a constant rate of 140 cc (STP)/min. over 0.018 inch-thick sheets weighing 20 grams. As seen in FIG. 1, for the first two hours of the experiment a dry gas mixture containing about 9 percent $CH_4$, balance $H_2$, was flowed over the sheet specimen at 1300° F. The amount of carbon pickup measured was in excellent agreement with that predicted by equation (III) above. When carburization had proceeded to approximately the steady-state carbon level, water vapor in the amount of 1.7 percent (of the total gas mixture) was introduced into the controlled atmosphere. As is clearly evident, the introduction of water vapor to such a mixture made $CH_4$ behave like an inert component of a wet decarburizing annealing atmosphere. Similar experiments were conducted at 1500° F. in an atmosphere containing 2.8 percent $H_2O$, with the same results. Thus, it is clear that reaction (III) is completely blocked by an effective amount of water in annealing atmospheres at temperatures from about 1200° to 16° F.

In the continuous decarburization annealing of steel sheet of strip such as electrical sheet, the annealing atmosphere flows counter to the strip motion in the furnace, resulting in an undesirable buildup of CO in the zone where the strip enters the furnace. CO is undesirable since it slows the desired decarburization by a back reaction primarily in accord with equation (I) above. In present practice, the amount of CO is maintained at desirable levels (generally less than 5%, and desirably less than 3%) by purging with large amounts of pure $N_2$ and $H_2$ through the system—a quite costly procedure. For example, if under specific conditions of temperature and gas activity, CO is found to increase to a level of 5 percent and it is desired to reduce this level to about 2.5 percent to prevent the back reaction from occuring, this would require the removal of one-half of the CO containing atmosphere, and introducing twice as much $N_2+H_2$ into the system. On the other hand, having established that $CH_4$ behaves like an inert component of a wet decarburizing annealing atmosphere, the removal of the same amount of atmosphere containing undesirable CO and the catalytic conversion of the CO content thereof to $CH_4$ by the reaction

  (IV)

the resultant $CH_4$ and $H_2O$ could then be recycled to the annealing atmosphere, significantly reducing the consumption of pure $N_2$ and $H_2$.

FIG. 2 is a representational illustration of a roller hearth line for the continuous decarburization annealing of steel sheet, employing both essential features as well as preferred embodiments of the recycle system of the instant invention. Steel sheet 1 enters furnace 2 in the direction shown by the solid arrows, passes over the rollers in the hearth, through zones A through T and exits the furnace at 3. As with conventional practice, dry nitrogen is introduced near the exit end of the furnace, e.g. at zones Q through T, while dry hydrogen is introduced at zones L through O; whereby it could be considered that the dry atmosphere would thus flow (as indicated by the broken arrows) from about the M/N zone of the furnace toward the exit end thereof. To enhance decarburization, steam 4 is introduced at zones D through L; whereby the wet atmosphere would flow from about the M/N zone of the furnace toward the entrance thereof. Maximum economy would be achieved if all the furnace gas flowing from right to left were recycled in accord with the instant invention. However, if the steel sheet entering the furnace were to have its surface contaminated with sulfur compounds, it would be preferable that the gas atmosphere closest to the entrance portion of the furnace, e.g. zones A through C, be exhausted, thereby minimizing the sulfur compounds carried into the recycle system and avoiding the possible poisoning of the catalyst employed in the methanation process. Thus, as shown in FIG. 2, in accord with this preferred embodiment, the hot, wet gas at a temperature generally ranging from 1200–1600° F. containing $H_2$, $N_2$, and a undesirable level (dependent on temperature and the partial pressures of $H_2$, $H_2O$ and $CO_2$) of CO would be withdrawn near zone D at 5 and cooled in heat exchanger 6 to a temperature of, for example, 700–900° F., because the methanation reaction is strongly exothermic and favored by maintaining the methanation catalyst within such a temperature range. The cool $H_2$ gas, which in conventional practice would be added directly at zones F through I, may partially be diverted so as to blend at point 7 with the furnace gas leaving the heat exchanger, before being pumped by 8 into catalytic converter 9. It is desirable that gas pump 8 be placed in the coolest region of the recycle system so as to minimize problems associated with pumping of hot gases. Dilution of the wet furnace gas with $H_2$ also favors the methanation reaction, which is accomplished in well-known manner, see, for example, "Gas Purification" 2 Ed., F. C. Riesenfeld et al, pp. 638–640. Thereafter, the gas mixture from the catalytic converter may be returned via heat exchanger 6 to the original $H_2$ entry ports, zones F through I, so as to minimize energy losses in the recycle process.

To determine whether the rate of the back conversion of $CH_4$ to CO was sufficiently low in an industrial furnace, the CO and $CH_4$ contents of the decarburization annealing atmosphere were continuously monitored at zone D, both prior to and during a time interval when $CH_4$ was added at a rate of 60 cubic feet per hour into zone I. By measuring the increase of the CO content and the $CH_4$ content at zone D after reaching a steady-state condition in 2–3 hours, the fraction of back conversion of $CH_4$ to CO (catalyzed both by the heating elements and by the steel sheet itself) in zones D through I was therefore calculated. As a result of such calculation, it was determined that less than 12 percent of the $CH_4$ theoretically convertible back to CO had, in fact, been so converted. Since laboratory experiments had shown that the steel being processed is a very poor catalyst for this conversion, it may be assumed that the bulk of such conversion was catalyzed by the nickel content of the strip heater elements in the furnace. Thus, replacement of such heater elements with a nickel-free alloy should reduce the extent of this catalyzed back-conversion still further.

I claim:

1. In the continuous decarburization annealing of steel strip, wherein the strip is passed substantially horizontally through an elongated furnace and an annealing atmosphere containing $H_2$ and $H_2O$ is flowed in a direction counter to the strip motion resulting in a build-up in the CO content of the atmosphere in the area where the strip enters the furnace, the atmosphere in said build-up area also containing $H_2$, $N_2$ and $H_2O$ at temperatures of 1200° to 1600° F., the method for preventing said CO from increasing to a level at which the decarburization rate of the strip surface is materially decreased, comprising, (a) at a first zone in the build-up area of the furnace, withdrawing an amount of said atmosphere, (b) reacting said withdrawn atmosphere with $H_2$ in contact with a methanation catalyst to convert a substantial portion of the CO content therein to $CH_4$ and $H_4O$, (c) introducing the reaction product into said furnace at a zone thereof downstream, with respect to the strip travel, of the first zone, wherein the amount of atmosphere withdrawn in step (a) and the resulting reaction product introduced in step (c) are effective to decrease the CO content thereof to a level below which the decarburization rate is not materially decreased.

2. The method of claim 1, wherein said gases are cooled to a temperature of 700 to 900° F. prior to reaction in contact with said methanation catalyst.

3. The method of claim 2, wherein the reaction product is introduced into said furnace at a zone in which the atmosphere therein contains water vapor.

4. The method of claim 3, wherein the water vapor present in said zone results from the introduction of such vapor, in addition to the water vapor present in said reaction product.

5. The method of claim 1, wherein the amount of atmosphere withdrawn from said first zone is at least sufficient to prevent the maximum CO level of the furnace atmosphere from exceeding 5 percent.

6. The method of claim 1, wherein the amount of atmosphere withdrawn is sufficient to prevent said maximum CO level from exceeding 3 percent.

7. The method of claims 1 or 2, wherein said CO is continuously withdrawn so as to maintain the CO content at a level below which decarburization is not materially decreased.

* * * * *